July 31, 1951 J. B. ENGLE 2,562,706
WHEEL SUSPENSION FOR MOTOR VEHICLES
Filed July 29, 1948

INVENTOR.
JOHN B. ENGLE
BY
Gordon C. Mack
Attorney

Patented July 31, 1951

2,562,706

UNITED STATES PATENT OFFICE 2,562,706

WHEEL SUSPENSION FOR MOTOR VEHICLES

John B. Engle, Akron, Ohio

Application July 29, 1948, Serial No. 41,206

1 Claim. (Cl. 280—96.2)

This invention relates to an improvement in the design of wheel suspensions for motor vehicles.

The invention provides means for dampening the horizontal component of a shock to which the front wheel of a vehicle is subjected on encountering an obstacle or unevenness in the surface of the road. If the vehicle is equipped with a conventional knee-action spring which dampens the vertical shock components, the dampening of the horizontal shock supplements the action of this spring.

According to this invention horizontally-acting cushioning means is positioned between (1) the steering knuckle and the axle of the front wheel which move as a unit and (2) the frame of the car, to absorb at least some of the shock caused by the wheel encountering an unevenness in the road, etc. One or more horizontal coil springs will ordinarily be used for dampening the shock at each of the front wheels, although other horizontally-acting cushioning means may be employed.

The invention will be further described in connection with the accompanying drawings, in which.

Figure 1:
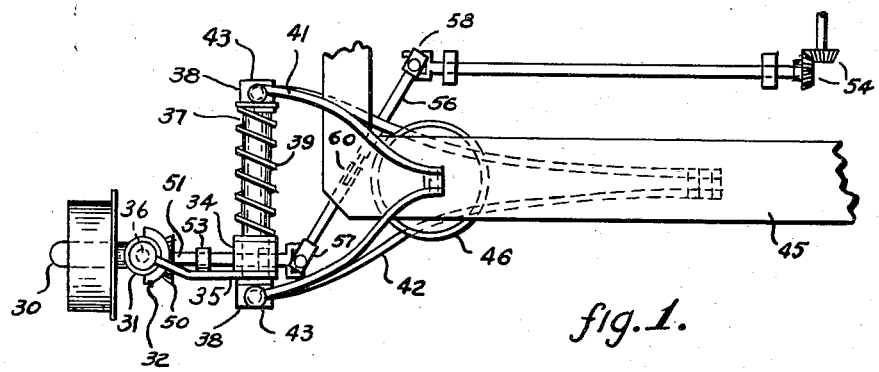
Figure 1 is a plan view of a preferred wheel suspension.
Figure 2:
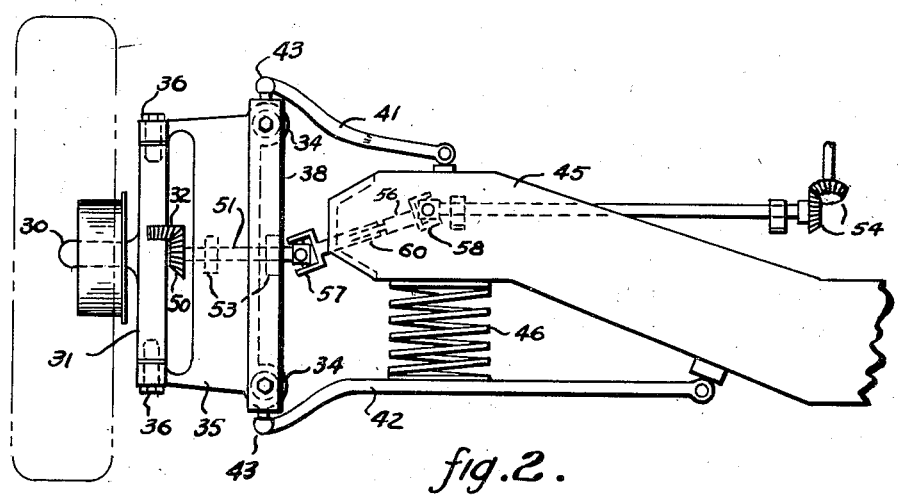
Figure 2 is a front view of the same.
Figure 3:
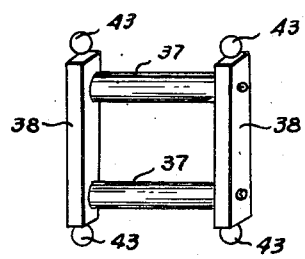
Figure 3 is a perspective view of the horizontal shafts and supporting bars of Figures 1 and 2, omitting the springs, etc.

The axle 30, the steering knuckle 31 and the bevel track 32 are cast as an integral unit. The journals 34 and the plate or knuckle support 35 are cast as a unit. These together with the knuckle form the steering knuckle unit. The plate serves to support the axle and it is pivoted at each extreme of the steering knuckle 31 by suitable bearings 36 which may be removably attached to the plate. The journals 34 are slidably mounted on the two parallel guide rods 37, one being located directly below the other in a plane that is perpendicular to the ground. These guide rods are bolted between two vertical bars 38. The guide rods 37 are always maintained in a horizontal position and the movement of the journals 34 is horizontal. It is opposed by the action of helical coil springs 39. When an obstacle is encountered in the road, the journals 34 slide back on the guide rods 37, and compress the springs 39. The work absorbed in compressing the springs dampens the horizontal shock component.

The upper and lower control forks 41 and 42 are pivoted by ball-and-socket joints 43 at the upper and lower ends of the vertical guide-supporting bars 38. The opposite ends of the control forks are pivoted to the forward chassis cross-member 45. The lower control fork 42 acts against a conventional knee-action spring 46 to allow for absorption of the vertical shock components. These forks permit vertical movements of the cushioning means but support it immovably longitudinally of the frame of the automobile.

In this type of wheel suspension, steering is accomplished by means of the bevel gear 50 in mesh with the bevel track 32 on the steering knuckle 31. The bevel gear shaft 51 is supported on the bearings 53 mounted on the plate 35. The force required to turn the wheels is transmitted from the steering gears 54 to the bevel-gear shaft 51 through a link 56 that is connected to shaft 51 and the steering assembly by universal joints 57 and 58. A splined slip-joint 60 in the link 56 allows for the change in length of the link when the wheel strikes an obstacle or irregularity in the pavement, with the resulting compression in the springs 39.

The steering knuckle remains in the same relative position to the axle at all times. There is no possibility of the slightest interference with the steering. By dampening the horizontal shock component the riding qualities of the automobile are materially improved.

In an installation of the equipment on a vehicle the cushioning means employed will preferably include guide means such as the guide rods 37 and resilient compression means such as the springs 39. The cushioning means will be supported immovably longitudinally of the frame with the guide means disposed horizontally. Since the cushioning means is designed to cushion the horizontal shock components the guide means will always be maintained in a substantially horizontal position.

What I claim is:

A wheel-suspension mechanism for a vehicle, comprising a wheel on an axis, a steering knuckle unit which includes a steering knuckle and steering-knuckle support extending laterally therefrom, cushioning means which includes guide means disposed longitudinally of the vehicle, the said knuckle unit being supported in fixed relation to the axis of the wheel, the guide means being slidably supported by the knuckle unit with the knuckle unit adapted to slide longitudinally with respect to the vehicle along the guide means, longitudinally resilient compression means supported at its rear end in the cushioning means to prevent rearward movement thereof and having its other end in contact with the rear of the knuckle unit and adapted to be compressed as the guide means is slid forward with respect to the knuckle unit, whereby when the wheel strikes an obstacle in its path the wheel and knuckle unit move rearwardly of the frame of the vehicle against the resistance of said compression means which tends to prevent said rearward movement.

JOHN B. ENGLE.

REFERENCES CITED

The following references are of record in the file of this patent:

UNITED STATES PATENTS

| Number | Name | Date |
|---|---|---|
| 1,154,143 | MacVicar | Sept. 21, 1915 |
| 1,251,348 | Dawson | Dec. 25, 1917 |
| 1,386,855 | Ewing | Aug. 9, 1921 |
| 2,123,961 | Peterson | July 19, 1938 |
| 2,233,145 | Schimek | Feb. 25, 1941 |
| 2,310,821 | Wimbish | Feb. 9, 1943 |

FOREIGN PATENTS

| Number | Country | Date |
|---|---|---|
| 321,370 | Italy | Oct. 2, 1934 |
| 652,485 | France | Oct. 23, 1928 |